United States Patent
Lowell et al.

[15] 3,648,388
[45] Mar. 14, 1972

[54] TEACHING DEVICE

[72] Inventors: Edgar L. Lowell, Los Angeles; Aaron H. Lipsky, Beverly Hills, both of Calif.

[73] Assignee: John Tracy Clinic, Los Angeles, Calif.

[22] Filed: Nov. 20, 1969

[21] Appl. No.: 878,421

[52] U.S. Cl. .................................................. 35/9 A
[51] Int. Cl. .......................................... G09b 7/06
[58] Field of Search ............................ 35/8, 9, 48, 9 A

[56] References Cited

UNITED STATES PATENTS

| | | | |
|---|---|---|---|
| Re.23,030 | 8/1948 | Holt | 35/48 |
| 2,877,568 | 3/1959 | Besnard et al. | 35/9 |
| 2,983,054 | 5/1961 | Twyford | 35/9 |
| 3,070,904 | 1/1963 | Saba | 35/9 |
| 3,141,244 | 7/1964 | Smith | 35/9 |
| 3,452,449 | 7/1969 | Mitchell | 35/9 |
| 3,477,142 | 11/1969 | Cornell et al. | 35/9 |

*Primary Examiner*—Wm. H. Grieb
*Attorney*—Lyon & Lyon

[57] ABSTRACT

A teaching device for use with a slide or film strip projector which is adapted to project images from a series of slides regulates the advance of the slides. The device includes a housing having a plurality of select switches and an advance switch which actuates the advance of each slide. Circuit means within the housing prevent operation of the advance switch until the correct selection of one of the select switches is made for each slide. Removable program means adapted to be inserted into the housing to program the circuit means for each series of slides.

23 Claims, 6 Drawing Figures

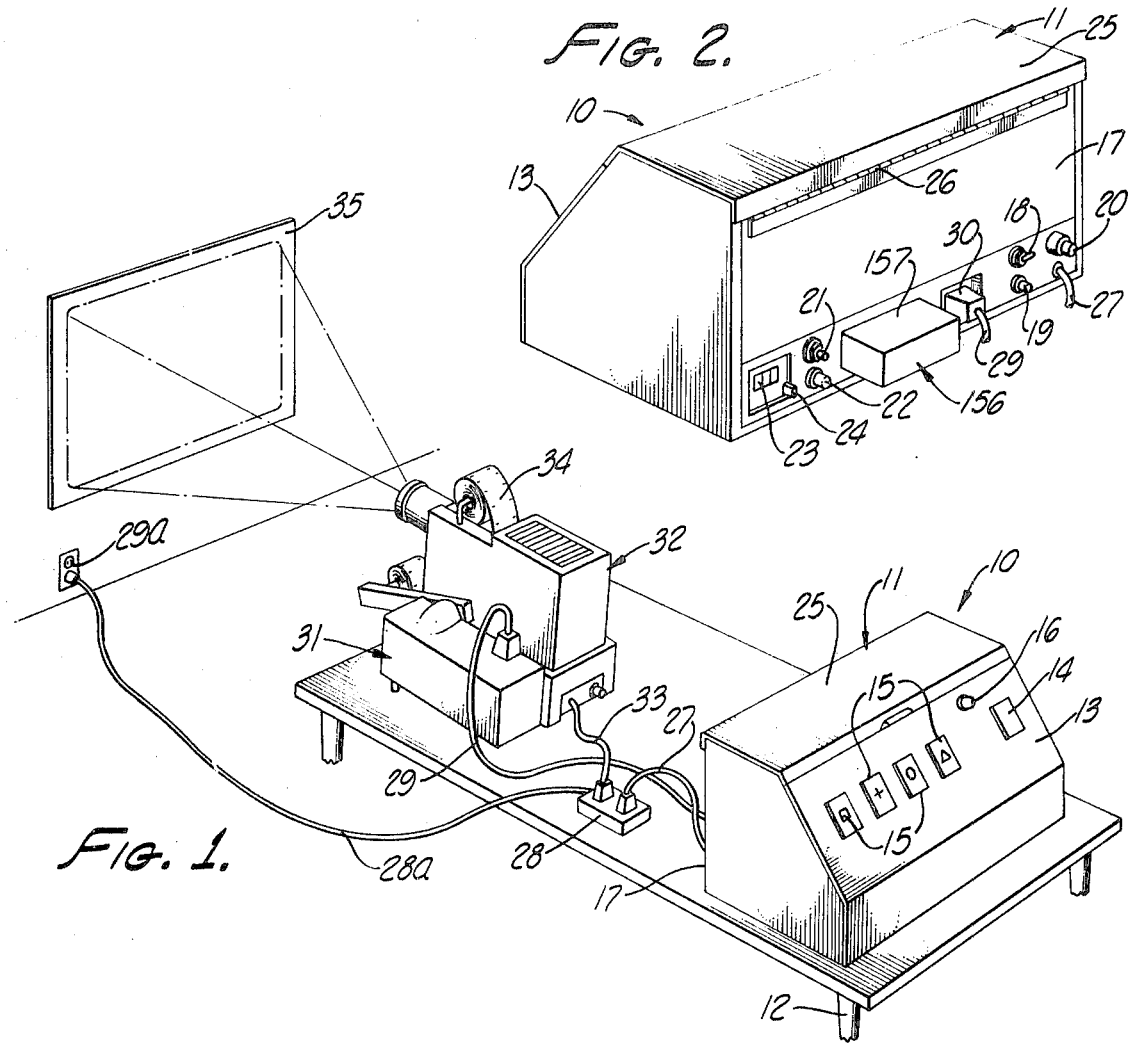

3,648,388

TEACHING DEVICE

This invention relates to a visual teaching apparatus and more particularly relates to a device which regulates the advance of slides in a slide projector.

Slide projectors have been found to be an effective teaching aid, particularly with deaf students. Frequently, the projector is used for testing purposes. In which case the images projected present a particular problem or question to which the student or students are required to respond. After the response the slide is advanced and another image which presents a new question is projected. Generally, when a group of students are responding, the responses are recorded and subsequently corrected by the teacher and then given back to the student. This procedure while providing the advantage of group instruction is disadvantageous because it does not immediately inform the student of his mistake and allow him to relate the correct response to the image. Thus, the use of the projector by the teacher is generally more effective when only a single student is responding because the teacher can advise the student of incorrect responses immediately and while the image presenting the question is still before the student. Normally, however, the teacher does not have time for such individual instruction. Moreover, in both group testing or instruction and individual instruction the teacher is generally required to operate the projector.

Therefore, it is a primary object of this invention to provide a device for use with a slide projector which will regulate the advance of the slides according to a students response to the image projected. To accomplish this and other objects, the device generally includes a control unit which is operably connected to the projector and which includes an advance switch and a plurality of select or multiple choice switches. The select switches relate generally to the images projected and the advance switch actuates the advance of the slides. Circuit means within the housing are adapted to prevent operation of the advance switch for each slide until the appropriate select switch for each image is chosen by the student. Removable program means are adapted to be inserted into the housing to program the circuit means and thereby determine the sequence of the appropriate select switches for a series of slides.

Another object of this invention is to provide a device which can be fully operated by a student without supervision and which will record incorrect responses by the student.

A still further object of this invention is to provide a device which is usable with any type remote control slide or film strip projector.

These and other objects and advantages will be made readily apparent from the accompanying drawings and following detailed description.

IN THE DRAWINGS

FIG. 1 is a perspective view of the device shown in connection with the film strip projector.

FIG. 2 is a perspective view of the housing.

FIG. 3 is a fragmentary perspective view of the program means.

FIG. 4 is a diagrammatic view of the program means.

Figure 5A:
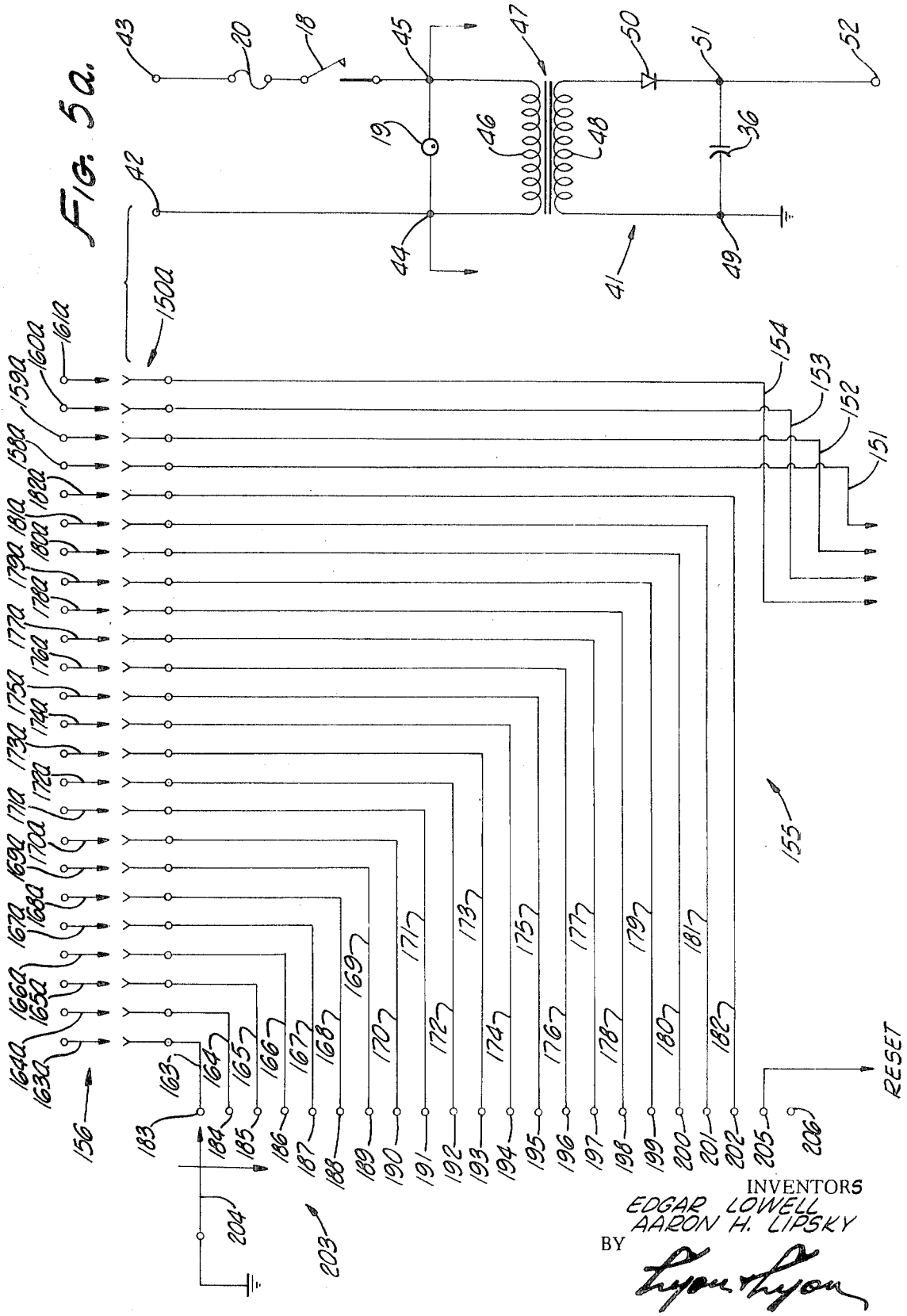
FIG. 5a is a schematic view illustrating a power supply and the connection of the program means with the circuit means.

Referring now in detail to the drawings, the device, generally designated 10, as seen in FIG. 1 includes a housing 11 which is generally adapted to rest on a flat surface or table 12. The housing 11 includes on an inclined front side or panel 13 and an advance switch or button 14 and a plurality of select or multiple choice switches or buttons 15. It should be noted that each multiple choice or select switch 15 includes a different symbol or mark; the function of these marks will be described later. An indicator light 16 is also located on the panel 13. The rear side or panel 17 of the housing 11 as shown in FIG. 2 includes a switch 18 which activates the device 10, a light 19 which indicates when the device 10 has been activated or turned on, and a fuse 20. A second switch 21 and a second light 22 are also included on the back panel 17. The switch 21 is adapted to reset the device 10 and the light 22 indicates when the switch 21 had been pressed. Also located on the back panel 17 is a mechanical counter 23 which is adapted to record incorrect responses and a lever 24 which is adapted to mechanically reset the counter 23. The top 25 of the housing 11 is hingedly secured to the back panel 17 at 26 to permit access to the interior of the housing 11 for repair and adjustment purposes.

An electrical cord 27 extending from the interior of the housing 11 is connected to a plug 28 which in turn is operably connected by a cord 28a to a convention wall plug 29a which is in turn connected to a power source, which is adapted to provide approximately 110 volts AC to the device 10. Another electrical cord 29 which is releasably secured at the back panel 17 by a plug 30 operably connects the device 10 to the remote control unit 31 of a standard film strip projector 32. An electrical cord 33 extending from the projector 32 connects the projector 32 to the plug 28 and the power source. It should be noted that cords 27 and 33 could be connected directly to the wall plug 29a and cord 28a and plug 28 are merely an extension of the wall plug 29a.

The projector 32 is adapted to project images from a series of slides 34 onto a screen 35. The slides 34 may be in the form of a roll as shown in FIG. 1 or merely unconnected flat rectangular units.

The circuit means, generally designated 40, controls the operation of the advance switch 14 and is located within the housing 11. The circuit means 40 is operated by power supply means 41 shown schematically in FIG. 5a. The power supply means 41 is connected at one end at the terminals 42 and 43 to a power source which supplies 110 volts alternating current. Thus, terminals 42 and 43 represent generally the leads of the electrical cord 27 connected to the socket 28. The fuse 20 and the switch 18 are connected in series to the voltage source terminals 42 and 43. The neon light 19 is connected across the terminals 42 and 43 and between terminals 44 and 45. A primary coil 46 of a transformer 47 is connected across the terminals 44 and 45. A secondary winding 48 on the transformer 47 has one side connected to a terminal 49 which is connected to ground and the other side connected through a rectifier 50 to a terminal 51 which is connected to a terminal 52. A capacitor 36 is connected across the terminals 49 and 51. The transformer 47 is adapted to reduce the 110 volts AC supplied to the voltage source terminals 42 and 43 to approximately 12.6 volts AC. The rectifier 50 changes the 12.6 volts AC to DC and supplies approximately 12 volts DC to terminal 52.

Figure 5B:
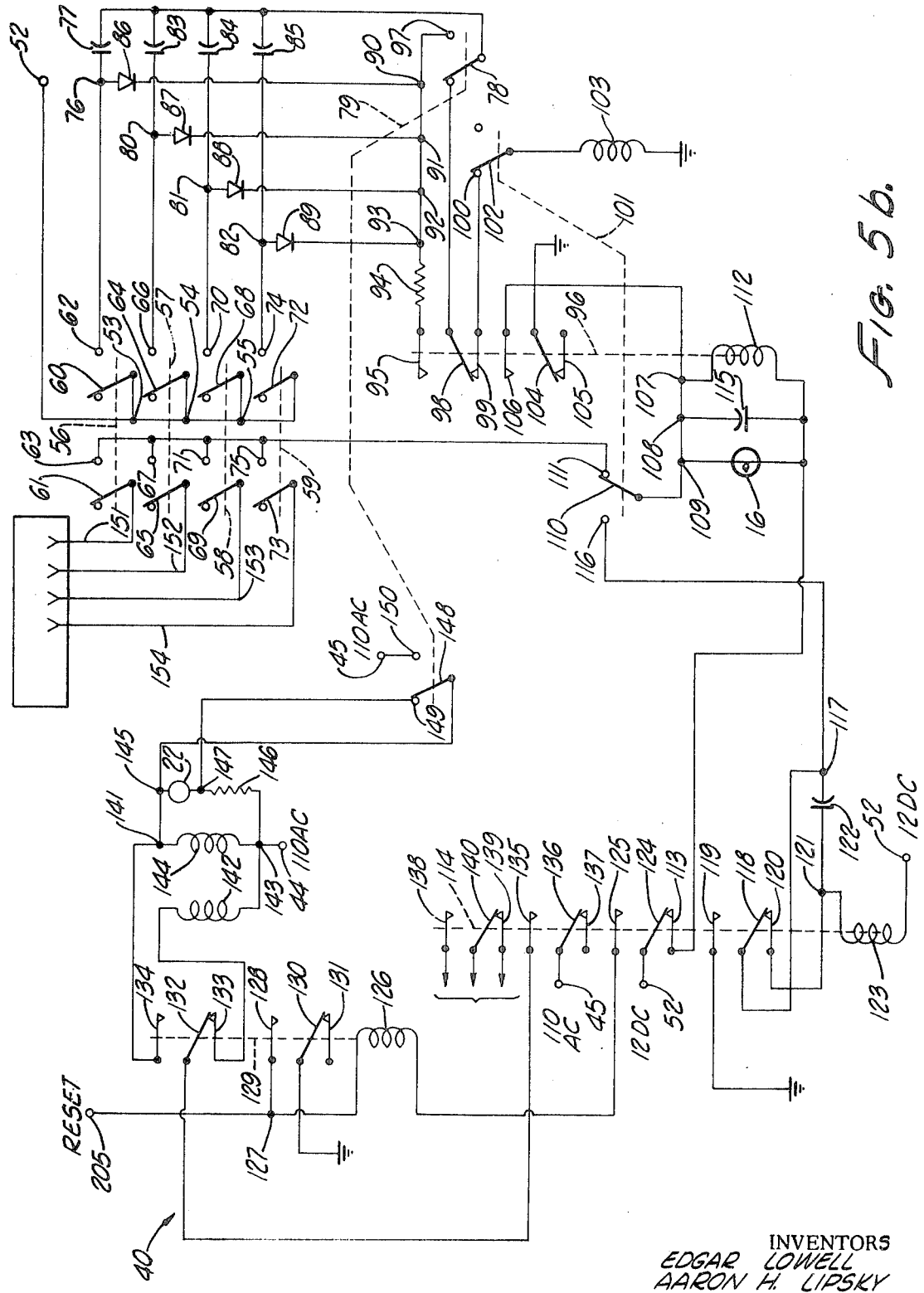
FIG. 5b is a schematic view of the circuit means and a continuation of FIG. 5a further illustrating the connection of the circuit means with the power supply and with the program means.

As shown in FIG. 5b, terminal 52 is connected through terminals 53, 54 and 55 to a series of double pole switches 56, 57, 58 and 59. These switches 56, 57, 58 and 59 represent the select switches 15. In the preferred embodiment four switches are shown, however, it will become evident that more or less switches can be used. Switch 56 includes a pair of moveable contacts 60 and 61 and a pair of fixed contacts 62 and 63. Switch 57 includes a pair of moveable contacts 64 and 65 and a pair of fixed contacts 66 and 67. Switch 58 includes a pair of moveable contacts 68 and 69 and a pair of fixed contacts 70 and 71 and switch 59 includes a pair of moveable contacts 72 and 73 and a pair of fixed contacts 74 and 75.

Fixed contact 62 is connected to terminal 76 which is connected through a capacitor 77 to the moveable contact 78 of a double pole switch 79. Fixed contacts 66, 70 and 74 are connected to terminals 80, 81 and 82, respectively, which are all connected through capacitors 83, 84 and 85, respectively, to the moveable contact 78 of the switch 79. Terminals 76, 80, 81 and 82 also are connected through diodes 86, 87, 88 and 89, respectively, to terminals 90, 91, 92 and 93, respectively.

Terminals 90, 91, 92 and 93 are all connected on one side through a resistor 94 to a fixed contact 95 on a double pole switch 96 and are all connected on the other side to a fixed contact 97 on the switch 79.

A moveable contact 98 of the switch 96 is connected to the moveable contact 78 of the switch 79. The moveable contact 98 is between the fixed contact 95 and a fixed contact 99 which is connected to a fixed contact 100 of a double pole switch 101. A moveable contact 102 of the switch 101 is connected through an error counter coil 103 of the error counter 23 to ground.

The other moveable contact 104 of the switch 96 is connected to ground and is positioned between fixed contacts 105 and 106. Fixed contact 106 is connected through terminals 107, 108 and 109 to a moveable contact 110 of the switch 101. A fixed contact 111 on one side of the moveable contact 110 is connected to the fixed contacts 63, 67, 71 and 75, of the switches 56, 57, 58, and 59, respectively.

Terminal 107 is connected through a coil 112 which actuates the switch 96 to a fixed contact 113 of a switch 114. Terminal 108 is connected through a capacitor 115 to the fixed contact 113, and terminal 109 is connected through the neon indicator light 16 to the fixed contact 113.

A fixed contact 116 of the switch 101 is connected to a terminal 117 which is connected to a moveable contact 118 of the switch 114. Moveable contact 118 is positioned between a fixed contact 119 which is connected to ground and a fixed contact 120 which is connected through a terminal 121 and a capacitor 122 to terminal 117. A coil 123 which actuates the switch 114 is connected between the terminal 121 and the 12 volt DC source terminal 52.

A moveable contact 124 of the switch 114 positioned between the fixed contact 113 and a fixed contact 125 is also connected to the 12 volt DC source terminal 52. Fixed contact 125 is contacted through a coil 126 to a terminal 127. Terminal 127 is connected on one side to a fixed contact 128 of a double pole switch 129 which is actuated by the coil 126. A moveable contact 130 of the switch 129 is positioned between the fixed contact 128 and a fixed contact 131 and is connected to ground. A moveable contact 132 of the switch 129 is positioned between a fixed contact 133 and a fixed contact 134 and is connected to a fixed contact 135 of the switch 114. A moveable contact 136 of the switch 114 is connected to the 110 volt AC source terminal 45 of the power means 41 and is positioned between the fixed contact 135 and a fixed contact 137. Fixed contacts 138 and 139 of the switch 114 and a moveable contact 140 between the fixed contacts 138 and 139 are all connected to an inlet socket (not shown) into which the plug 30 is adapted to be inserted.

Fixed contact 134 of the switch 129 is connected to a terminal 141 and fixed contact 133 is connected through a step coil 142 to a terminal 143. A reset coil 144 is connected between terminals 141 and 143 and terminal 143 is connected on one side to the 110 volt AC source terminal 44 of the power means 41. Terminal 141 is connected to a terminal 145 and terminal 143 is connected through a resistor 146 to a terminal 147. The light 22 is connected between the terminals 145 and 147. Terminal 145 is connected to a moveable contact 148 of the switch 79 which is the reset switch 21 and a terminal 147 is connected to a fixed contact 149 of the switch 79. A fixed contact 150 on the other side of the moveable contact 148 is connected to the 110 volt AC source terminal 45 of the power means 41.

The moveable contacts 61, 65, 69 and 73 of the switches 56, 57, 58 and 59, respectively, are connected to leads 151, 152, 153, and 154, respectively, of an inlet program socket 155 which is seen best in FIG. 5a. The inlet program socket 155 is adapted to receive the program means, generally designated 156.

The program means 156 as shown in FIG. 3, includes a plug housing 157, and a plurality of primary prongs 158, 159, 160, and 161 and a plurality of secondary prongs 162 which are slidably received by the circuit means. The primary prongs 158, 159, 160 and 161 include within the plug housing terminals 158a, 159a, 160a and 161a, respectively. In the particular embodiment shown in FIG. 4 the four terminals 158a, 159a, 160a and 161a, designated primary terminals, are adapted to be connected to the leads 151, 152, 153 and 154, respectively, as shown in FIG. 5a each of which is in turn connected to one of the select switches 15. The secondary prongs 162 include within the plug housing 157 terminals 163a, 164a, 165a, 166a, 167a, 168a, 169a, 170a, 171a, 172a, 173a, 174a, 175a, 176a, 177a, 178a, 179a, 180a, 181a and 182a. The other terminals or secondary terminals 163a to 182a of the program means 156, are all connected by internal wiring within the plug housing 157 to one of the primary terminals 158a, 159a, 160a and 161a. It should be noted that in the particular embodiment shown in FIG. 4 none of the secondary terminals are connected to the primary terminal 161a and the reason for this will be made evident later. The secondary terminals 163a to 182a are adapted to be connected to one of a series of leads 163 to 182, respectively, of the inlet socket. The leads 163 to 182 are connected to the fixed contacts 183 to 202, respectively, of a step switch 203. The moveable contact 204 of the step switch 203 is connected to ground and is adapted to move into contact with each of the fixed contacts 183 to 202. Switch 203 also includes two other fixed contacts 205 and 206. Fixed contact or reset contact 205 is operably connected to the reset switch 79.

The operation of the device is as follows:

A series of slides 34 are inserted into the projector 32. Each slide is adapted to produce an image which includes a question or a picture which presents a question or problem along with a series of answers, only one of which is correct for the particular question or problem. Along side each answer is a symbol which corresponds to one of the symbols on the select buttons 15. The program plug or means 156 is inserted into the inlet socket 150a to program the circuit means 40 according to the particular series of slides used in the projector. The program plug 156 is adapted to connect each one of the leads 163 to 182 and corresponding terminals 183 to 202 to switches 56, 57, 58 and 59 through the leads 151, 152, 153 and 154, respectively, and the particular program is dependent on the wiring or connection of the secondary terminals to the primary terminals. In the particular embodiment of the program means 156 shown in FIG. 4 the connection of the secondary terminals to the primary terminals are as follows:

Secondary terminals 181a, 178a, 175a, 171a, 165a and 163a are connected to the primary terminal 158a;

Secondary terminals 182a, 180a, 177a, 173a, 172a. 169a, 166a and 164a are connected to the primary terminal 159a;

and secondary terminals 179a, 176a, 174a, 170a, 168a and 167a are connected to the primary terminal 160a.

As was noted before, none of the secondary terminals in this embodiment are connected to the primary terminal 161a. This is because this particular plug is adapted for use with a series of slides which include only three answers for each question or problem and therefore only three select switches 15 are necessary to operate the device. However, it is evident that the wiring of the secondary terminals to the primary terminals can be changed to program the circuit means 40 to almost any series of slides. Moreover, because the program plug is removable and the program can be varied for each series of slides memorization of the program by the student is prevented.

Each slide and the question or problem presented by each slide correspond to one of the secondary terminals and the fixed contacts 183 and 202 of the switch 203 and the moveable contact 204 of the step switch 203 is adapted to be in contact with the fixed contact corresponding with the particular slide then being projected. It should be evident that almost any number of slides can be employed in each series because the fixed contacts can correspond to more than one slide.

After the series of slides 34 have been introduced into the projector 32 with the first slide positioned to project an image appropriate plug means 156 inserted into the inlet socket 150a, the device 10 is ready to be operated by the student. At this instance the moveable contact 204 of the step switch 203 is in its home position or in contact with fixed contact 183 and the other switches and relays are in their normal positions as shown in the drawings. When the image of the first slide is projected onto the screen 35, the student operating the device 10 views a problem or question, to which he is required to respond, and a series of answers. The student responds by pushing on the select switch 15 which has the same symbol as the one next to the answer which he has selected. A correct response is adapted to close the circuit from the 12 volt DC terminal 52 through the coil 112 and the step switch 203 to ground. In the particular embodiment described the correct response to the problem or question presented by the first slide is the closing of switch 56.

When switch 56 is closed, a current path will exist from ground through switch 203 through lead 163 to terminal 163a through to terminal 158a through lead 151 through switch 61 to fixed contact 63 through fixed contact 111 and moveable contact 110 through coil 112 and lamp 16 through fixed contact 113 and moveable contact 124 to voltage source terminal 52. The coil 112 is thereby energized and when energized, actuates switch 96 to move contact 104 into contact with fixed contact 106 and contact 98 into contact with fixed contact 95. The energizing of lamp 16 indicates to the student that he has made the correct response and therefore he pushes the advance switch 14 to advance the slide. Advance switch 14 is switch 101 and therefore pushing on switch 14 moves the moveable contact 110 into contact with the fixed contact 116. When switch 14 is pressed after a correct response has been made, a current path will exist from ground through contacts 104 and 106 through contacts 110 and 116 to terminal 117 through contacts 118 and 120 of switch 114 to terminal 121 through coil 123 to source terminal 52. It should be clearly noted that coil 123 is only energized when a correct response is made. As will be apparent from the following discussion when an incorrect response is made neither the lamp 16 nor the coil 112 is energized and therefore switch 96 is not actuated and coil 123 will be open circuited at contacts 104 and 106.

Coil 123 when energized actuates switch 114 to move contacts 118, 124, 136 and 140 into contact with the fixed contacts 119, 125, 135 and 138, respectively. These contacts remain as long as the current path exists through the coil 123. As seen in FIG. 5b the capacitor 122 is in series with the coil 123 and when contact 118 is moved into contact with the fixed contact 119 the current path through coil 123 is from ground through contacts 104 and 106 through contacts 110 and 116 to terminal 117 through capacitor 122 to terminal 121 through coil 123 to the source terminal 52. This current path will exist until the charge on the capacitor 122 equals the supply voltage; this takes approximately 0.20 seconds. Once the current path through the coil 123 no longer exists, the moveable contacts of the relay switch 114 will move back into their normal position. It should also be noted that once relay switch 114 has been actuated by coil 123 the current path through the coil 112 will be opened at contacts 118 and 120 and the contacts of switch 96 will then move back to their normal position.

Relay switch 114 when actuated creates a current path through the step coil 142. The current path is from the AC voltage source terminal 45 through contacts 136 and 135 through contacts 132 and 133 through step coil 142 to the AC voltage source terminal 44. Step coil 142 when energized actuates the step switch 203 and moves the contact 204 into contact with the next fixed contact, in this instance contact 184, since contact 204 was previously in contact with fixed contact 183 when the operation begin. The actuating of switch 114 also actuates the remote control unit 31 through the contacts 140 and 138 which advances the slide in the projector and the next image is then projected onto the screen 35. The device 10 is now ready for the students next response.

The operation of the device continues in this manner until the program has been completed in which case the moveable contact 204 of the step switch 203 is moved to the fixed contact 205. This will create a current path through coil 126. The current path is from the DC voltage source terminal 52 through contacts 124 and 125 through coil 126 through contacts 204 and 204 to ground. Coil 126 when energized, actuates switch 129 to move contact 132 into contact 134. This creates a current path through the reset coil 144 which when energized moves the contact 204 back into contact with fixed contact 183 to begin the repeat of the program. The current path through reset coil 144 is from the AC voltage source terminal 45 through contacts 136 and 135 through contacts 132 and 134 to terminal 141 through coil 144 to the AC voltage source terminal 44.

It is sometimes desirable to reset the step switch 203 before the program has been completed or before moveable contact 204 has moved into contact with the fixed contact 205. This would be the case when a student has failed to complete the test and another student is prepared to begin the test. In order to put the device in condition for the start of the test, the slides can be moved manually in the projector to the beginning position and the step switch 203 can be reset by actuating the reset switch 21 which is also switch 79. When switch 21 is pressed moveable contact 148 is moved into contact with fixed contact 150 to create a current path from the AC voltage source terminal 45 through contacts 150 and 148 to terminals 145 and 141 through the coil 144 and the lamp 22 and to the AC voltage source terminal 44.

The above discussion related to the operation of the device 10 when a correct response was made by the student. When an incorrect response is made, the pressing of the wrong select button 15 will not create a current path through the coil 112. For example, when the contact 204 of the step switch 203 is in contact with fixed contact 183, in the embodiment shown in FIG. 4, the current path is closed only when switch 56 is pressed to connect ground through contact 183 and terminal 163a with contact 63 through terminal 158a and lead 151. When any other switch is pressed the current path will remain open between contacts 61 and 63. However, the closing of any of the switches 56, 57, 58 and 59 will create another current path through the error counter coil 103 except when the switch closed is the correct switch. If the correct switch is 56, when switch 57 is pushed a current path will be created through error counter coil 103. The current path from DC voltage source terminal 52 to terminal 54 through contacts 64 and 66 to terminal 80 through capacitor 83 through contacts 98 and 99 through contacts 100 and 102 through coil 103 to ground. The energizing of the error counter coil 103 will cause the error counter 23 to register one error. The current path through the coil 103 will cease to exist when the charge on the capacitor 83 equals the power supply voltage. The capacitor 83 will remain charged until the correct switch is pressed and therefore pressing switch 57 a second time will not actuate the error counter. However, an additional two errors will be recorded if the other incorrect switches are each pressed before the correct switch is pressed. When the correct switch is pressed any charged capacitors 78, 83, 84 or 85 will be discharged through the diodes 86, 87, 88 and 89, respectively. As noted before, the coil 112 when energized moves contact 98 into contact with the fixed contact 95 to open the current path through the coil 103 at contacts 98 and 99 and short the circuit through the capacitors 78, 83, 84 and 85. Since coil 112 is adapted to operate faster than the error counter coil 103, even though the pressing of the correct switch connects one of the contacts 60, 64, 68 or 72 with a fixed contact 62, 66, 70 and 74, respectively, the current path through coil 103 will be opened at contacts 98 and 99 before the counter 23 is actuated. The capacitors 78, 83, 84 and 85 are also discharged by pressing the reset switch 21 which is also switch 79 and which causes contact 78 to move into contact with contact 97. This in turn causes the circuit through the capacitors 78, 83, 84 and 85 to be shortened.

This invention provides an effective teaching device which can be used by a student without the direct supervision of an instructor. The invention is a particularly effective test device where a series of slides provided are used to present a various group of questions or problems each of which requires a response since the invention is adapted to record automatically any incorrect responses and also is adapted to advise the student of a correct response. Moreover, the invention can be used with a variety of prepared series of slides and the programming of current responses can be easily changed to avoid circumvention of the teaching effect of the invention.

We claim:

1. A teaching device for use with a projector having a remote control unit and adapted to project images from a series of film frames, comprising:
   circuit means operably connected to the remote control unit; a predetermined plurality of select switches associated with each image projected;
   advance means operably connected to said circuit means and adapted to actuate the remote control unit and thereby advance each frame;
   means adapted to connect said circuit means to a power source;
   said circuit means adapted to prevent operation of said advance means until the correct select switch of said predetermined plurality of select switches for each image has been selected and operated; and program means physically separate from said film frames and electrically interconnecting said circuit means with said predetermined plurality of select switches to program said circuit means and thereby determine an electrically changeable sequence of correct select switches for the images.

2. The device of claim 1, wherein an error counter is provided, said error counter being electrically connected to said circuit means and said circuit means adapted to actuate said error counter when an incorrect select switch is selected and operated for each image.

3. The device of claim 1, wherein indicator means operably connected to the circuit means are provided to indicate when the correct switch has been selected and operated for each image.

4. The device of claim 1, wherein said program means is removable whereby different program means can be employed for the same series of film frames.

5. The device of claim 1, wherein reset means are provided, said reset means being electrically connected to said circuit means and being adapted to reset the program of said circuit means.

6. A device to regulate the operation of a remote control unit of a slide projector, comprising:
   circuit means operably connected to the remote control unit and adapted to be connected to a power source; a predetermined plurality of select switches each adapted to close said circuit means;
   advance means operably connected to said circuit means and adapted to actuate the remote control unit when said circuit means has been closed; and
   program means electrically but not optically interconnecting one of said predetermined plurality of select switches to said circuit means prior to each operation of said advance means whereby the operation of one select switch closes said circuit means and permits actuation of the remote control unit.

7. The device of claim 6 wherein said circuit means includes recording means, said recording means adapted to record the operation of each select switch except said one select switch prior to each actuation of the remote control unit.

8. The device of claim 6 wherein indicator means are provided, said indicator means operably connected to said circuit means and adapted to indicate when said one select switch is operated prior to each actuation of the remote control unit.

9. The device of claim 6, wherein reset means are provided, said reset means operably connected to said circuit means and having a reset switch, said reset means adapted to reset said program means when said reset switch is operated.

10. A device to regulate the operation of a remote control unit of a slide projector, comprising: circuit means operably connected to the remote control unit and adapted to be connected to a power source; a plurality of select switches each adapted to close said circuit means; an advance switch operably connected to said circuit means and adapted to actuate the remote control unit when said circuit means has been closed; program means operably connecting one of said select switches to said circuit means prior to each operation of said advance switch whereby the operation of said one select switch closes said circuit means and permits actuation of the remote control unit; said circuit means including a step switch, said step switch optically connected with said program means and being adapted to advance after each actuation of said remote control unit whereby the select switch closing said circuit means varies.

11. The device of claim 10 wherein said program means includes a plurality of primary terminals and a plurality of secondary terminals, each of said secondary terminals connected to one of said primary terminals, each of said primary terminals connected to one of said select switches, and each advance of said step switch connecting said step switch to one of said secondary terminals.

12. A device to regulate the operation of a remote control unit of a slide projector, comprising: circuit means operably connected to the remote control unit and adapted to be connected to a power source; a plurality of select switches each adapted to close said circuit means; an advance switch operably connected to said circuit means and adapted to actuate the remote control unit when said circuit means has been closed; and program means operably connecting one of said select switches to said circuit means prior to each operation of said advance switch whereby the operation of said one select switch closes said circuit means and permits actuation of the remote control unit, said program means comprising a plug with multiple prongs having internally wired terminals.

13. The device of claim 12, wherein said program means is removably connected to said circuit means by said prongs.

14. A device to regulate the operation of a remote control unit of a slide projector, comprising:
   circuit means operably connected to the remote control unit and adapted to be connected to a power source;
   a plurality of select switches for closing said circuit means;
   said circuit means including a step switch having a moveable contact and a plurality of fixed contacts;
   program means to program said circuit means having a plurality of primary terminals and a plurality of secondary terminals; each said secondary terminal connected to one of said step switch contacts and one of said primary terminals, each said primary terminal connected to one of said select switches;
   each said select switch operable to close said circuit means when said select switch is operably connected to said moveable contact through one of said primary terminals, at least one of said secondary terminals and one of said fixed contacts;
   an advance switch operably connected to said circuit means for actuating the remote control unit when said circuit means has been closed; and
   said moveable contact advancing from one of said fixed contacts to another of said fixed contacts after each actuation of the remote control unit whereby the select switch operable to close said circuit means varies with each actuation of the remote control unit.

15. The device of claim 14, wherein said circuit means includes reset means having a reset switch, said reset means adapted to advance said moveable contact to a predetermined fixed contact when said reset switch is operated.

16. The device of claim 14, wherein said circuit means includes error recording means, said error recording means recording only once the operation of each said select switch except said select switch operable to close said circuit means prior to each actuation of the remote control unit.